Patented Feb. 4, 1930

1,745,533

UNITED STATES PATENT OFFICE

WILLIS A. GIBBONS, OF LITTLE NECK, AND THOMAS V. BINMORE, OF LONG ISLAND CITY, NEW YORK, ASSIGNORS TO THE MECHANICAL RUBBER COMPANY, OF CLEVELAND, OHIO, A CORPORATION OF NEW JERSEY

HARD RUBBER VARNISH, PROCESS FOR MAKING SAME, AND ARTICLES MADE THEREFROM

No Drawing.   Application filed February 17, 1925. Serial No. 9,812.

This invention relates to a hard rubber varnish; a process for making same; and articles made therefrom.

This application is a continuation-in-part of application Serial No. 674,999, filed November 15, 1923.

Solutions of vulcanized rubber have been heretofore prepared but each possesses one or more of the following characteristics which makes it undesirable or useless as a varnish. First, the solutions previously made contain such low percentage of vulcanized rubber that they could not be economically employed for varnishing articles, the concentration usually obtained being 2 to 10%. Second, attempts to increase the non-volatile content have resulted in solutions of such increased viscosity that the solutions were not applicable as a varnish, or would produce gels at high concentrations. Third, the solution has had as a solvent an oil which was so slowly volatile at atmospheric temperatures that the film of varnish applied dried too slowly for practical use. This difficulty can be overcome by the application of heat for relatively long periods of time. This, however, is not practical for many applications of varnish. Fourth, proportions of combined sulphur have been insufficient to produce a film which would have the characteristics of a good varnish film. Fifth, excess sulphur was present in the resulting solution producing upon evaporation of the solution a coating having the surface roughened by crystals of the free sulphur. Sixth, the solvent employed has been one which reacts readily with sulphur to produce substances having an offensive odor and which remain behind to adulterate the film resulting on evaporation of the solution. Seventh, the solution has been practically opaque and it has been impossible to produce desired color effects with pigments or other colors.

It is the practice in the rubber industry to pass sheets of holland cloth or parchment paper between the rolls of a calender and to deposit directly on this paper as it passes through the rolls a thin coat of rubber. This coated holland cloth or parchment paper is then rolled up and, without unrolling, is cut, for example in the manufacture of joining- or seaming-tapes; or the rubber coated carrier may be used in flat form for cutting of football bladders or the like. In the case of the tape the carrier of holland cloth or parchment paper is destroyed, and frequently in manufacturing articles such as football bladders, the stamping out process also destroys the carrier. It is sometimes the practice, however, to use the holland cloth employed for coating where football bladders, etc., are made to cut out these articles after removal of the rubber coating, the holland cloth being used over and over again. But in the case of both holland cloth and the parchment paper the mechanical strength is relatively low, and particularly in the case of parchment paper deteriorates rapidly on using, due at least in part to the heat of the calender and of the rubber coating as it comes from the calender. In addition these carriers are relatively expensive and their destruction and deterioration means increased cost in manufacture of these materials.

In the electrical industry a usual form of electrical insulation is paper coated with an oleo-resinous varnish. These papers are used frequently where temperatures as high as 150° C. are obtained and under such temperatures their life is relatively short entailing increased maintenance cost.

It has been proposed to treat paper with soft vulcanized rubber solutions, that is having a low sulphur content and having the characteristics of soft rubber, but the products produced have the disadvantage that unvulcanized rubber coatings placed thereon, for example by calendering as above, tend to adhere and it has been impossible to remove the coatings from such material. This action is probably due, at least in part, to migration of sulphur from the soft vulcanized rubber to the unvulcanized rubber coating. Such paper also tends to decompose under the relatively high temperatures to which electrical insulation is subjected.

An object of the present invention accordingly is to produce a hard rubber varnish which shall do away with the objectionable features of vulcanized rubber solutions heretofore produced; and to provide a simple efficient process for the production of such solutions. Another object of the invention is to provide a solution of hard rubber of sufficiently high concentration to be applicable as a varnish. Another object of the invention is to do away with the disadvantages of coated paper and fabrics heretofore proposed and to provide among other inexpensive articles a coated paper, easily manufactured, having along with other good properties high mechanical strength, good resistance to deterioration through heat or chemical agents, a surface which is non-adhesive and of a relatively high dielectric resistance.

The invention accordingly comprises a clear translucent solution of vulcanized rubber containing more than 15% of combined sulphur, and containing substantially no free sulphur. It also includes a process for making a hard rubber varnish which comprises dissolving rubber in a high boiling solvent, preferably one of the aromatic series, adding sufficient sulphur to produce a vulcanized rubber having a combined sulphur content of approximately from 15 to not over 32%, which latter is the theoretical maximum for combined sulphur, and heating the solution and sulphur with the rubber to produce a free flowing vulcanized hard rubber varnish containing approximately 15-32% of combined sulphur. A varnish so obtained is fluid after concentration to a solid content of percentages up to 50 and often up to 80%. This high concentration is necessary in a varnish to produce what is known to paint and varnish users as good body.

*Example 1.*—In carrying out the invention in its preferred form, to 100 parts by weight of solvent naphtha having the usual boiling point (or the material known commercially as high-flash naphtha having a somewhat higher boiling point), 10 parts by weight of a vulcanized scrap rubber, for example ground inner tubes, are added in finely divided form. The mixture of high flash solvent naphtha and vulcanized rubber is heated with stirring in a jacketed kettle for 2 to 3 hrs. at the boiling point of the solvent, approximately 163° C., until a substantially clear solution free from lumps of undissolved rubber is obtained. If it is not possible to heat to 163° C. it is preferable to add the rubber in two portions of 5 parts each at intervals of 1 to 1½ hrs. During the process of vulcanization some of the sulphur is lost as hydrogen sulphide and other by products of the reaction so that the dry film of the varnish analyses approximately 15% total sulphur by the usual analytical methods employed.

Prior to adding the ground inner tubes to the solvent an analysis of the tube is made for the sulphur and rubber content. When the rubber is thoroughly dissolved sufficient sulphur is added to bring the total sulphur present to a ratio of 30 parts of sulphur to 100 of rubber. For example, if the ground inner tubes are found on analysis to contain 6 parts of sulphur per 100 of rubber, 24 parts of sulphur to 100 of rubber are added. Stirring and heating of the mass is then continued until a film of the solution when dried is hard and has practically lost its stickiness. This reaction will require 2½ hrs. where a temperature of 163° C. approximately is employed. Where lower temperatures are used a correspondingly longer time is necessary. The solution is allowed to cool and may be used at the concentration then obtained. It is preferable, however, to concentrate the solution so that the solution contains approximately 25% of vulcanized rubber.

*Example 2.*—As another example of the invention vaulcanized rubber containing admixed substances such as fillers or fibres is treated as in Example 1 so that the proportion of rubber to solvent is approximately 10%. The solution is carried on by stirring and heating at approximately 163° C. When the rubber is in solution it is freed from the suspended admixed materials by filtration, settling, centrifuging or some similar process. The sulphur content is then brought up to approximately 20 parts of sulphur for every 100 of rubber and heating with stirring is then continued at approximately 163° C. until a film of the solution when dried is hard and has lost its stickiness.

*Example 4.*—The vulcanizing action of the sulphur may be accelerated by the use of various accelerators, preferably such that volatilization does not occur at the temperature employed during heating, though of course if heating is carried on in a closed vessel under pressure this requirement may be eliminated. An example of such use of an accelerator is as follows: To 100 parts of solvent naphtha, 10 parts by weight of vulcanized rubber are added and heating and stirring carried on at approximately 143° C. until solution is effected. The sulphur content of the rubber having been determined sufficient sulphur is added as in Example 1 to bring up the total sulphur to approximately 32%. To this mixture is then added 2 parts of dibenzylamine dibenzylaminodithiocarbamate with 5 parts of zinc oxide. Heating and stirring is then continued for 12 hrs. at 143° C. at the end of which time the solution is allowed to stand until excess zinc oxide settles to the bottom. The solution is decanted and may be concentrated as above if desired.

The hard rubber solutions obtained by the above processes are translucent solutions, having viscosities as indicated below, containing more than 15% of combined sulphur and containing practically no free sulphur.

The varnish films obtained from the solutions mentioned in the above examples are hard, resistant to the action of light, strong or weak acids, and alkalies. The film is insoluble and not attacked by common organic solvents such as alcohol, acetone, gasoline and benzene. The viscosity of an approximately 12% solution is 1.02 Engler viscosimeter at 50° C. Solutions of higher concentration can be prepared with only slightly increased viscosity, for example a 24% solution has a viscosity of approximately 2.2 Engler at 50° C. A 50% solution has a viscosity of 9.2 Engler at 50° C. The solutions may be prepared inexpensively.

Instead of solvent naphtha, xylene, naphthalene and other solvents may be used preferably hydrocarbons of the aromatic series of high boiling point, that is above 110° C. approximately. The time and temperature of heating may be varied as desired. In the case of naphthalene the preferred time is ½ to 1 hr. at 210° C. for the completion of vulcanization. Where a concentration of the solution is afterwards carried out naphthalene is sublimed. If desired, the solution may be brought almost to dryness and thereafter may be redissolved in another solvent. The product made with naphthalene can be dissolved in solvent naphtha and the naphthalene separated by crystallization in the cold.

The varnish can be used in general varnish work on wood, fabric, metal or other materials. It can be used on rubber articles and is particularly useful where such articles are subjected to flexing, having high flexibility and adherence. On account of its resistance to acids, etc. and its high dielectric strength, it can be used in chemical and electrical insulation. The varnish can be suitably tinted with soluble dyes or insoluble pigments for decorative work. It can be applied by dipping, flowing, brushing or spraying in the same way as ordinary paint or varnish is applied, allowing the solvent or thinner to evaporate. In the case of naphthalene solution where the solution is liquefied by the addition of solvent naphtha, the last traces of naphthalene can be removed by heating the varnished articles during drying, during which the naphthalene sublimes.

In producing a varnished paper in accordance with the invention, the following process is carried out: A sheet of kraft paper of 60 lbs. basis weight is passed through a 35% solution of hard vulcanized rubber, the rubber containing 15 to 32% of combined sulphur and no free sulphur. The hard rubber solution referred to, is preferably made by the process set forth above, but may be made by any other desired process that is within the scope of the invention. The paper after having been dipped is allowed to dry at room temperature. Higher temperatures may be employed if desired.

Paper treated according to the above process showed a tensile strength equal to that of the original paper and a bursting strength nearly twice that of the untreated paper. In an insulation test the treated paper punctured at a tension of 1500 volts per mil. Upon long exposure to temperatures to which papers coated with an oleo-resinous varnish are subjected in electrical insulation, practically no deterioration was observed. The tensile strength test on the treated paper after soaking in water was substantially the same as unwetted paper, showing that the material has a high resistance to the action of water. Upon being subjected to various alkaline chemicals it showed approximately the same resistance as ordinary hard rubber. A sheet of uncured rubber calendered directly upon the treated paper in accordance with the usual procedure showed no tendency to stick even though the two were wrapped together under normal pressure employed in the factory and subjected to an elevated temperature for a longer period than would ordinarily be used in factory processes.

If instead of kraft paper employed in the above example a casein-treated paper or similar paper heavily surface-sized is employed, the resulting hard rubber-coated paper is top-coated substantially without impregnation. On the other hand if a paper having substantially less sizing than kraft paper such as mimeograph paper is employed, an even greater impregnation may be secured than where a sizing is present. In place of paper, fabrics such as holland, muslins and silks, with or without sizing, may be employed, the process being carried out in exactly the same way as recited in the above example. Holland fabric so treated is stronger than ordinary holland cloth and as well has the other desirable properties mentioned above of hard rubber varnished paper.

If desired the surface may be dressed by passing the dried paper through calender rolls lubricated with paraffin although a satisfactory paper is obtained without this process.

The process of manufacturing varnished paper, it will be noted, is a simple one and the product itself is inexpensive and otherwise fulfills the requisites set out above.

Having thus described our invention, what we claim and desire to protect by Letters Patent is:

1. A free flowing, translucent solution of vulcanized rubber in an organic solvent of the aromatic series, containing not less than ten percent of solid materials, and having at least 15 percent of combined sulphur and having substantially no free sulphur, the solution in concentrations of substantially 10–50% having a viscosity of between approximately 1 and approximately 10 Engler at 50° C. and capable of quick drying at ordinary temperature, said varnish being prepared by dissolving vulcanized rubber in said solvent and heating in the presence of the required amount of sulphur until the varnish is free flowing and substantially free of uncombined sulphur.

2. A free flowing, translucent solution of vulcanized rubber in an organic solvent of the aromatic series, containing not less than ten percent of solid materials, and having at least 15 percent of combined sulphur and having substantially no free sulphur, the solution in concentrations of substantially 10–50% having a viscosity of between approximately 1 and approximately 10 Engler at 50° C., and producing upon drying at ordinary temperature a film which is substantially free from stickiness, said varnish being prepared by dissolving vulcanized rubber in said solvent and heating in the presence of the required amount of sulphur until the varnish is free flowing and substantially free of uncombined sulphur.

3. A free flowing, translucent solution of vulcanized rubber in a high boiling solvent of the aromatic series and which is formed by the reaction of at least 20 parts of sulphur on 100 parts of rubber, said solution containing not less than ten percent of solid materials and having at least 15 percent of combined sulphur on the rubber and having substantially no free sulphur, the solution in concentrations of substantially 10–50% having a viscosity of between approximately 1 and approximately 10 Engler at 50° C., and producing upon drying at ordinary temperature a film which is substantially free from stickiness, said varnish being prepared by dissolving vulcanized rubber in said solvent and heating in the presence of the required amount of sulphur until the varnish is free flowing and substantially free of uncombined sulphur.

4. A vulcanized hard rubber varnish comprising a solution of vulcanized rubber in a high boiling solvent of the aromatic series substantially free from uncombined sulphur, free flowing in concentrations up to substantially 50%, and having the properties of good body and quick drying at ordinary temperatures, said varnish being prepared by dissolving vulcanized rubber in said solvent and heating in the presence of the required amount of sulphur until the varnish is free flowing and substantially free of uncombined sulphur.

5. A hard rubber varnish comprising a free flowing solution of vulcanized rubber in a high boiling solvent of the aromatic series, said solution having at least 15 percent of combined sulphur, substantially no free sulphur, a viscosity of between approximately 1 and approximately 10 Engler at 50° C. in concentrations of substantially 10–50%, and capable of drying at ordinary temperature to a film substantially free from stickiness, said varnish being prepared by dissolving vulcanized rubber in said solvent and heating in the presence of the required amount of sulphur until the varnish is free flowing and substantially free of uncombined sulphur.

6. A process for making a hard rubber varnish which comprises first dissolving vulcanized rubber to a fluid condition in a heated high boiling solvent, then adding sufficient sulphur to produce a vulcanized rubber having a combined sulphur content of approximately 15–32%, and heating the solution and sulphur to produce a free flowing vulcanized hard rubber varnish containing approximately 15–32% of combined sulphur, and substantially no free sulphur.

7. A process for making a hard rubber varnish which comprises first dissolving vulcanized rubber of predetermined sulphur content to a fluid condition in a heated high boiling aromatic solvent, then adding sufficient sulphur to produce a vulcanized rubber having a combined sulphur content of approximately 15–32%, and heating the solution and sulphur to produce a free flowing vulcanized hard rubber varnish containing approximately 15–32% of combined sulphur and substantially no free sulphur.

8. A process for making a hard rubber varnish which comprises first dissolving vulcanized rubber to a fluid condition in a heated high boiling solvent at atmospheric pressure to form approximately a 10% solution, then adding sufficient sulphur to produce a vulcanized rubber having a combined sulphur content of 15–32%, and heating the solution and sulphur to produce a free flowing vulcanized hard rubber varnish containing approximately 15–32% of combined sulphur and substantially no free sulphur.

9. A process for making a hard rubber varnish which comprises first dissolving vulcanized rubber to a fluid condition in a high boiling solvent at its boiling point to produce approximately a 10% solution, then adding sufficient sulphur to produce a vulcanized rubber having a combined sulphur content of approximately 32%, and heating the solution and sulphur to produce a free flowing vulcanized hard rubber varnish containing 32% of combined sulphur and substantially no free sulphur.

10. A process for making a hard rubber varnish which comprises mixing finely divided vulcanized rubber in boiling solvent naphtha having a boiling point of 160–170° C. approximately at atmospheric pressure and stirring the mixture until the rubber is dissolved, adding sufficient sulphur to produce a vulcanized rubber having a combined sulphur content of approximately 32%, and heating the solution and sulphur to approximately the boiling point of the solvent naphtha to produce a free flowing vulcanized hard rubber solution containing substantially 32% of combined sulphur and substantially no free sulphur.

Signed at New York, New York, this 13th day of February, 1925.

WILLIS A. GIBBONS.

Signed at New York, New York, this 13th day of February, 1925.

THOMAS V. BINMORE.